Figure 1:
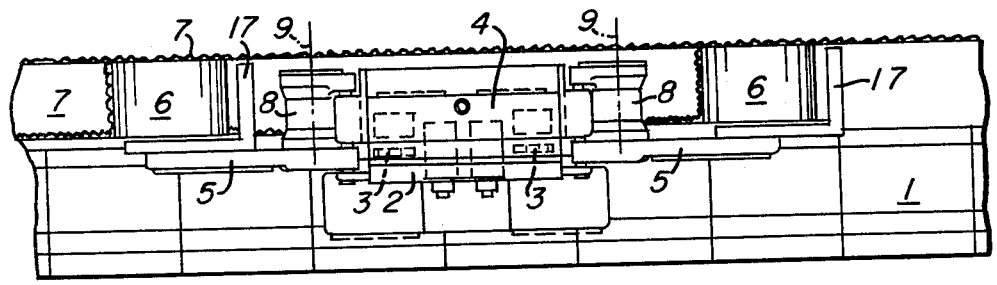

United States Patent [19]

Weber

[11] 4,270,072
[45] May 26, 1981

[54] CURRENT SUPPLY CIRCUIT OF CUTTING DRUM MOTORS ON A MINING MACHINE

[75] Inventor: Karl-Heinz Weber, Witten-Heven, Fed. Rep. of Germany

[73] Assignee: Gebr. Eickhoff Maschinenfabrik und Eisengeisserei m.b.H., Bochum, Fed. Rep. of Germany

[21] Appl. No.: 4,428

[22] Filed: Jan. 18, 1979

[51] Int. Cl.³ ............................................... H02P 1/54
[52] U.S. Cl. ...................................... 318/34; 318/51; 318/59; 318/66; 318/67
[58] Field of Search .................. 318/51, 59, 66, 67, 318/39, 34; 299/48, 53, 54; 307/23, 28, 29

[56] References Cited
U.S. PATENT DOCUMENTS 3,136,535  6/1964  Lanfermann ...................... 299/53 X
3,753,002  8/1973  Jacobson et al. .................. 307/23 X

*Primary Examiner*—Ulysses Weldon
*Attorney, Agent, or Firm*—Thomas H. Murray; Clifford A. Poff

[57] ABSTRACT

A cable extending onto a drum-cutter loader mining machine has divided branch cable sections to supply electrical current to the individual drive motors for each of two cutting drums. A branch switch coupled in each divided branch cable section and a thyristor controller is coupled in one branch cable section before the switch therein. Crossover lines bridge the branch switches in each divided branch cable section. Bridge switches in each of the bridging crossover lines are used together with the branch switches to deliver electrical current from the controller to either or, if desired, both of the separate drive motors.

4 Claims, 2 Drawing Figures

U.S. Patent

May 26, 1981

4,270,072

CURRENT SUPPLY CIRCUIT OF CUTTING DRUM MOTORS ON A MINING MACHINE

BACKGROUND OF THE INVENTION

This invention relates to a current supply circuit for a mining machine, particularly a drum-cutter loader having two cutting drums each independently driven by a drive motor. More particularly, the present invention relates to such a current supply circuit receiving power from a cable which is divided into two sections on the mining machine with each section arranged to supply electrical power to one of the individual drive motors for the cutter drums.

In the publication entitled "Schneidende Gewinnung mit Eickhoff-Walzenladern" by Gebr. Eickhoff Maschinenfabrik und Eisengiesserei m.b.H. there is disclosed on page 8 a drum-cutter loader mining machine in which each of two cutter drums is driven by an independent electric motor. The two electric motors are connected to an electric supply circuit of the heading by a common cable which is divided inside the machinery of the mining machine into two sections which extend one each to an electric motor for driving a cutter drum.

U.S. Pat. No. 3,633,081, assigned to the Assignee of this invention, discloses a control for the driving motor of a winch used on a drum-cutter loader mining machine to propel the machine along the mine face. The winch driving motor control is effected through the use of a three-phase controller. A first electric motor drives the cutting element on the mining machine and a second electric motor drives the winch used to advance the mining machine along the mine face. The torque and speed of the winch motor are reduced when both the cutting element drive motor is idling and when the cutting motor is overloaded. The control system operates so that as the cutting element approaches a coal seam and driven in an idling speed, the speed of the winch drive motor is relatively low. When the cutter enters the coal face and the current to the cutter drive motor increases, the speed of the winch drive motor is also increased and when the cutter drive motor is overloaded, the winch drive motor is reversed to withdraw the cutting element from the coal face and thereafter again advance the cutting element into the coal face in a step-like manner.

In a drum-cutter loader mining machine having two motors each driving an independent cutter drum, the motor coupled to drive the cutter drum which is leading in relation to the movement of the mining machine, is normally more heavily loaded than the motor coupled to drive the cutter drum which is trailing in relation to movement by the mining machine. Both motors, however, run at substantially the same speed.

SUMMARY OF THE INVENTION

It is an object of the present invention to provide a control circuit to enable the two cutter drums at opposite ends of a drum-cutter mining machine to rotate at different speeds by controlling the motors therefor whereby the leading and more heavily loaded cutter drum rotates at a working speed while the trailing cutter drum rotates at a speed below its normal speed to reduce the production of dust.

More particularly, according to the present invention, there is provided in a mining machine such as a drum-cutter loader, having two cutter drums independently driven by separate drive motors each supplied with electrical current from a divided branch section of a common cable extending onto the mining machine, the combination therewith of branch switch means coupled in each divided branch section of the cable, controller means coupled in one divided branch section of the cable before the branch switch means therein, crossover lines bridging the branch switch means in each divided branch section of the cable, and bridge switch means in each bridging crossover line whereby the branch switch means and the bridge switch means are operatively coupled to deliver electrical current from the controller means to either of the separate drive motors.

Thus, according to the present invention, the current supply circuit includes two branch sections each having a branch switch and can be connected to one another by means of two crossover lines which bridge the two branch switches and each of which has a bridge switch coupled therein. Current supplied by a thyristor controller in one of the two sections is selectively coupled to either driving motor. A circuit arrangement of this type enables the use of a single thyristor controller which can be, for example, a three-phase alternating voltage regulator or a static frequency converter to control one or the other of the driving motors for the two cutter drums and to regulate the speed of the driving motors down to the limit of the motor torque. In this range of motor operation, the motor torque remains at its rated value but the motor speed is reduced considerably below its rated value, with the attending advantage of minimizing the evolution of dust during the operation of the mining machine. The circuit arrangement of the present invention also enables a reduction to the speeds of both cutter drums to a further reduced value and, through the agency of a coupling between the drum and the associated clearing plate, to pivot the clearing plate from its instantaneous operative position to another operative position beyond the drum using the driving force developed by the motor for the cutter drum. Another advantage arising out of the circuit arrangement of the present invention is that, if required, the two drive motors can be controlled together by means of a single thyristor controller or can be directly connected to the current supply cable.

Figure 2:
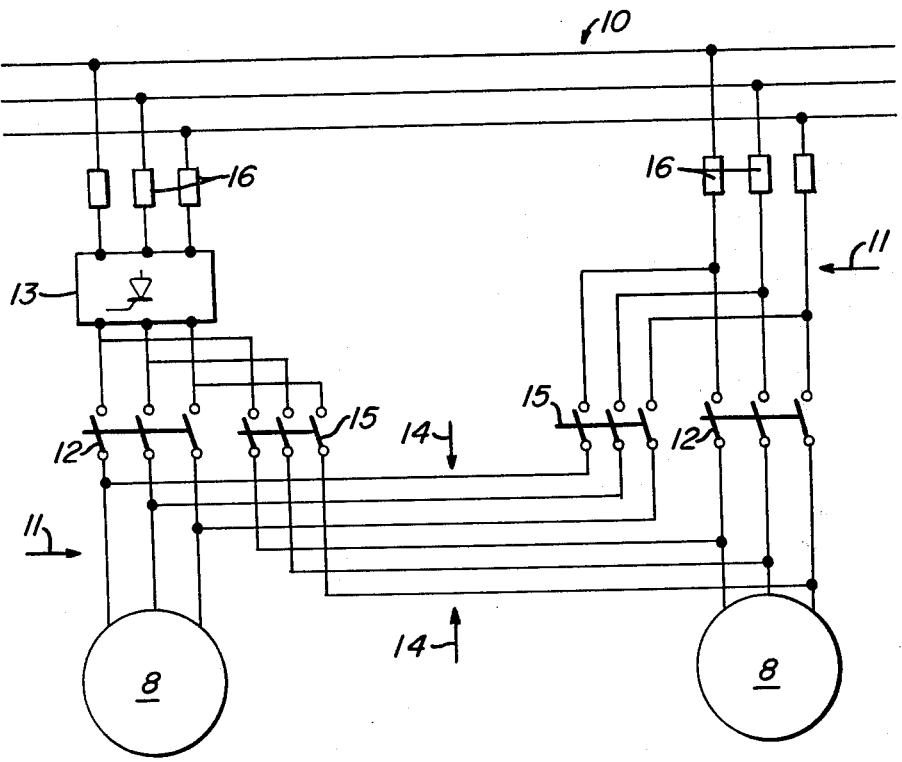

These features and advantages of the present invention as well as others will be more fully understood when the following description is read in light of the accompanying drawings, in which:

FIG. 1 is a plan view of a drum-cutter loader mining machine having drum cutters at opposite ends thereof; and FIG. 2 is a diagram of an electrical circuit for supplying current to the separate motors for the drum cutters of the mining machine shown in FIG. 1.

In FIG. 1, there is illustrated a mining machine in the form of a drum-cutter loader 2 movable along a face conveyor 1. The drum-cutter loader 2 is disposed above the face side wall of the face conveyor and bears mainly upon the face ramp, not shown, of the conveyor 1. The drum-cutter loader is moved along and guided by a toothed rack in a manner which is well known in the art. The toothed rack is carried on the face conveyor 1 above the face ramp. The drum-cutter loader 2 is advanced along the face conveyor by means of two driving wheels 3, each associated with a winch 4 and engaged in the teeth of the rack. At each end of the mining machine, a cutter drum 6 is mounted for rotation about a horizontal axis and for rotatable positioning by a vertically-adjustable support arm 5 to work a mine seam indicated in FIG. 1 by reference numeral 7. Each cutter drum 6 is driven by a drive motor 8 which is located at the opposite end of the support arm 5 and directly connected to the associated cutter drum 6 by means of gearing, not shown, arranged within the associated support arm 5. Each motor 8 is, therefore, pivoted about pivot axis 9 formed by a pivot shaft for the support arm of the cutter drum 6. A clearing plate 17 is mounted on each support arm 5 for pivotal movement about the rotational axis of the cutter drum. The clearing plate is used to cover the peripheral portion of the cutter drum which is remote from the working face of the mine.

Electrical current is supplied to the drum-cutter loader of FIG. 1 by a cable 10 from a supply network of the heading with the necessary electrical power for operation of the mining machine. The cable 10 which is made up of, for example, three or six conductors, is introduced at one end of the machinery section of the drum-cutter loader and divided within this section into branch lines. More particularly, as shown in FIG. 2, the cable 10 is divided into two branch sections 11, each extending to one of the motors 8. The conductors in each section 11 are coupled to a switch 12 in series with resistors 16. A three-phase controller 13 in one of the sections 11 is coupled in the branch line between the switch 12 and the resistor 16. The two motors 8 can be connected to one or the other of the two sections 11 by two crossover lines 14 which bridge the two switches 12. Each of the crossover lines 14 includes a switch 15 coupled therein.

In the operation of this electrical circuit, the driving motor 8 for the cutter drum which is trailing in relation to the movement of the drum-cutter loader along the mine face can always be controlled by means of the single controller 13 and, hence, operates at a controllably required speed at which dust remains within tolerable limits at the working environment of the mining machine. However, the motor 8 coupled for rotating the cutter drum 6 which is leading in respect to the advancing movement of the drum-cutter mining machine is supplied by electrical current from a cable section 11 which is devoid of the controller 13 whereby this motor runs at its working speed and rotates the associated cutter drum 6 at the corresponding speed. In the preferred form of the present invention, the controller 13 takes the form of a thyristor for controlling the speed of a driving motor. Typically, the driving motors operate with three-phase alternating current and the controller takes the form of a three-phase alternating current voltage regulator. However, the controller may take the form of a static frequency converter. By the use of the switches 12 and 15 in each of the branch lines and bridging lines, respectively, these switches may be operatively positioned, if desired, to deliver electrical current from the controller 13 to each of the separate drive motors 8.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a mining machine adapted to move back and forth along a mine seam such as a drum-cutter loader, having two cutting drums independently driven by separate drive motors each supplied with electrical current from a divided branch section of a common cable extending onto the mining machine, the combination therewith of branch switch means coupled in each divided branch section of the cable, controller means coupled in one divided branch section of the cable before the branch switch means therein, crossover lines bridging the branch switch means in each divided branch section of the cable, and bridge switch means in each bridging crossover line whereby said branch switch means and said bridge switch means are operatively coupled to deliver electrical current from said controller means to one of either of the seperate drive motors for rotating the cutting drum which is trailing in relation to movement by the mining machine and to deliver electrical current to the other of the separate drive motors from the remaining divided branch section of the cable for rotating the cutting drum which is leading in relation to movement by the mining machine.

2. The combination of claim 1 wherein said controller means includes a thyristor for controlling the speed of one of either of said separate drive motors.

3. The combination of claim 1 wherein said drive motors operate with three-phase alternating current, and said controller means includes a three-phase alternating current voltage regulator.

4. The combination of claim 1 wherein said drive motors operate with three-phase current, and said controller means includes a static frequency converter.

* * * * *

UNITED STATES PATENT OFFICE
CERTIFICATE OF CORRECTION

Patent No. 4,270,072      Dated  May 26, 1981

Inventor(s) Karl-Heinz Weber

It is certified that error appears in the above-identified patent and that said Letters Patent are hereby corrected as shown below:

add to the facing sheet:

Foreign Application Priority Data

February 18, 1978 [DE] Fed. Rep. of Germany....2807057

Signed and Sealed this

Twenty-fifth Day of August 1981

[SEAL]

Attest:

Attesting Officer

GERALD J. MOSSINGHOFF

Commissioner of Patents and Trademarks